(12) United States Patent
Berni et al.

(10) Patent No.: US 8,628,739 B2
(45) Date of Patent: Jan. 14, 2014

(54) DIRECT PURIFICATION OF A NICKEL LATERITE LEACHING EFFLUENT

(75) Inventors: Tiago Valentim Berni, Belo Horizonte (BR); Antonio Clareti Pereira, Belo Horizone (BR)

(73) Assignee: Vale, Rio de Janeiro (BR)

( * ) Notice: Subject to any disclaimer, the term of this patent is extended or adjusted under 35 U.S.C. 154(b) by 0 days.

(21) Appl. No.: 13/364,107

(22) Filed: Feb. 1, 2012

(65) Prior Publication Data

US 2012/0213681 A1    Aug. 23, 2012

Related U.S. Application Data

(60) Provisional application No. 61/438,513, filed on Feb. 1, 2011.

(51) Int. Cl.
    *C22B 23/00* (2006.01)
(52) U.S. Cl.
    USPC ............................................. 423/139; 423/24

(58) Field of Classification Search
    USPC .................... 423/24, 27, 33, 39, 139, 150.1
    See application file for complete search history.

(56) References Cited

U.S. PATENT DOCUMENTS 6,350,420 B1 *  2/2002  Duyvesteyn et al. ......... 423/139

FOREIGN PATENT DOCUMENTS

| WO | 2008/138039 | * | 11/2008 |
| WO | 2010/000029 | * | 1/2010 |

* cited by examiner

*Primary Examiner* — Steven Bos
(74) *Attorney, Agent, or Firm* — Arent Fox LLP

(57) ABSTRACT

The present invention refers to a direct purification process of a nickel laterite leaching effluent including adjusting a pH of a leaching solution, employing an ion exchange resin to adsorb nickel and copper selectively over ferric or ferrous iron, and recovering nickel.

11 Claims, 1 Drawing Sheet

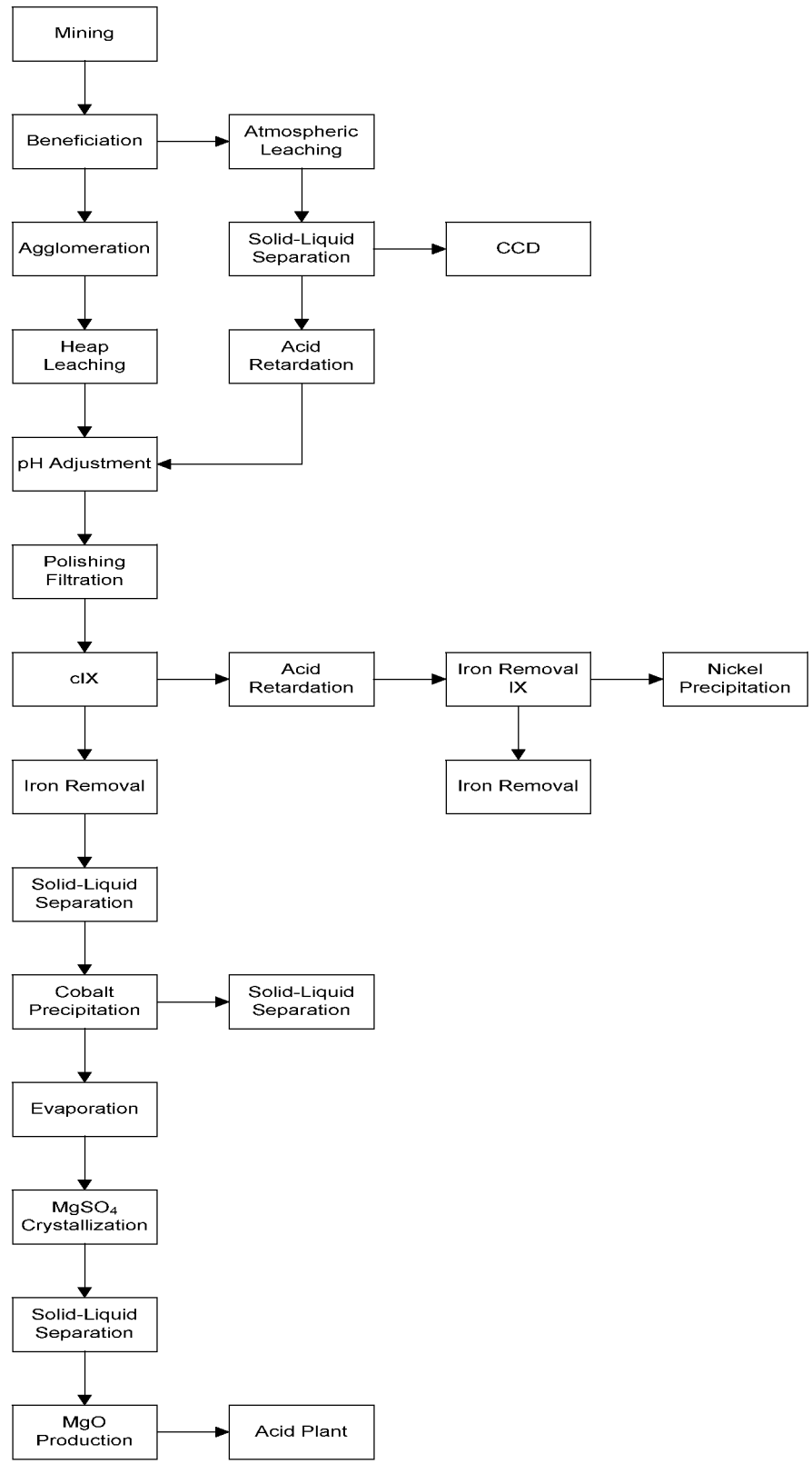

DIRECT PURIFICATION OF A NICKEL LATERITE LEACHING EFFLUENT

This application claims priority from U.S. Patent Application No. 61/438,513, filed on Feb. 1, 2011, titled "Direct Purification of a Nickel Laterite Leaching Effluent," which is incorporated herein by reference in its entirety.

BACKGROUND OF THE INVENTION

1. Field of Invention

Aspects of the present invention relate to methods and systems for direct purification processes of a nickel laterite leaching effluent.

2. Description of Related Art

A problem in nickel laterite processing is downstream purification. Options currently available are generally expensive, complex and often have to deal with high nickel losses in tailings. Costly downstream processing is often one of the factors responsible for the high costs of new nickel laterite projects. One of the main issues of downstream purification is the prior removal of iron and aluminum from solution before precipitation.

SUMMARY OF THE INVENTION

Aspects of the process of the current invention is suitable for any leaching process available today or that may be developed in the future, as long as base metals such as nickel and cobalt are properly solubilized.

Aspects of the process of the current invention utilize a clean leaching effluent to work. If a High Pressure Leaching (HPAL), atmospheric leaching or other leaching process is used, prior removal of solids is generally needed. If heap leaching or other similar leaching method that already produces a leaching effluent that is free of solids is performed, such stage is not needed. These operations are widely known by those skilled in the art.

BRIEF DESCRIPTION OF THE DRAWINGS

The present invention will be described in more details further below based on the example of execution represented in the drawing.

FIG. 1 is a block diagram illustrating a direct purification process of a nickel laterite leaching effluent, object of the present invention.

DETAILED DESCRIPTION OF THE INVENTION

These and other features and advantages of this invention are described in, or are apparent from, the following detailed description of various example aspects of the current invention.

FIG. 1 is a block diagram illustrating a direct purification process of a nickel laterite leaching effluent, object of the present invention. According to various aspects, the leaching solution may be in a pH range of 1.0-3.0, and preferably between 1.5 and 2.0. This range of pH is helpful to avoid iron hydrolysis. If needed, the pH may be adjusted with lime, limestone, MgO or any other neutralizing agent of choice.

According to various aspects, the pH-adjusted solution goes through an ion exchange resin that has the functional group bis-picolylamine, as Dow Chemical M-4195, Lanxess TP 220 or any other ion exchange resin with that functional group. This functional group has the capability of adsorbing nickel and copper selectively over ferric or ferrous iron and other impurities commonly found in a nickel laterite leaching effluent. The leaching effluent, also known as pregnant leaching solution or PLS, may be fed into the system at any temperature between 0° C. and 100° C., but preferably between 20 and 70° C.

According to various aspects, the ion exchange resin may be employed in a conventional fixed bed system, also known as lead-lag, at a counter-current continuous system (cIX), or any other new equipment that may be developed, the second being preferred. Independently of the equipment, the ion exchange process has four main stages, namely loading, selective iron elution, elution and pre-conditioning.

Copper is strongly bound onto the resin, being only eluted using ammonium hydroxide solution. Ammonium sulphate or chloride may also be added to the system to reduce resin shrinking, preferably at concentrations between 0.1 and 5 molar. This solution may be fed at a pH range between 7 and 14, preferably between 8 and 10. According to various aspects, there are two main options to solve that issue. The first option is to use the same ion exchange resin, or a different ion exchange resin that loads copper preferably than other elements present, in a different system, as a copper guard. A simple lead-lag system, cIX or any other suitable equipment suitable may be employed. The second option is to add a copper elution stage inside the main cIX system, with the same discussed conditions. The same temperature range from loading may be employed, at a flow rate of 1 to 30 BV/h, preferably between 5 and 15 BV/h. A range between 1 and 50 BV is needed to be fed to properly remove copper, preferably between 2 and 10 BV.

According to various aspects, one of the stages of the ion exchange operation is loading. At this stage, nickel may be loaded preferably from other elements. Mostly nickel and ferric iron may be loaded at the resin. The solution, fed at the temperature range described above, may also be fed at a flow rate of 5 to 50 BV/h, preferably between 15 and 25 BV/H (bed volumes of resin per hour). One bed volume of resin is the volume of resin inside one column and normally used for volumetric flow rate description. One column may receive up to 50 BV of solution before exhaustion, but the range between 10 and 30 is preferred. Cobalt is not loaded under preferred conditions.

According to various aspects, some iron may be loaded into the resin and may be removed selectively by two methods: dilute sulphuric acid or nickel sulphate solution. The first method may use a dilute sulphuric acid solution (or of any other mineral acid) at concentrations between 0.01 and 10% in mass preferably between 0.25 and 2.5%. A range between 5 and 50 BV may be used to properly remove the iron from the resin, preferably between 10 and 20 BV. Flow rates may be between 5 and 20 BV/h, preferably between 10 and 15 BV/h. Temperature range may be the same as in loading. The second method may use a nickel sulphate solution to displace iron and properly load nickel into the resin. This nickel sulphate solution (or with matching anions from the mineral acid) may have a concentration of 1 to 400 g/L (proportionally changing if the anion is changed), preferably between 20 and 120 g/L at a pH range of 1 to 6, and preferably between 1.5 and 3. Flow rates, residence time and temperature work may be in the same range as specified for the other method, dilute sulphuric acid.

Nickel elution may be employed with sulphuric acid solution with concentrations in the range between 5 and 30%, preferably between 10 and 20%. The same temperatures, flow rates and residence times from the selective iron elution may be employed.

According to various aspects, the nickel eluate may be treated to remove the excess acid by using a acid retardation resin or acid membranes, preferably. Other methods may also be employed, such as neutralization of the acid with MgO or any other method known by those skilled in the art. Nickel may later be recovered any method known, as hydroxide or sulphide precipitation as well as electrowinning.

According to various aspects, the barren solution may be partially sent back to leaching. The high iron content may help reducing overall iron leaching and acid consumption.

According to various aspects, in order to recover cobalt, any method known in art may be used, as sulphide precipitation or hydroxide precipitation. Iron may be taken out first, also by conventional methods. Acid membranes or acid retardation ion exchange resins may also be used to recover acid prior to this stage.

According to various aspects, Manganese may be removed by contacting air with the solution in a packed column or any other equipment that increases air-solution contact. Other methods known in the literature may also be employed by those skilled in the art.

If only MgO is used as neutralizing agent, there may also be the possibility of recycling Mg and S. The final effluent may be rich in $MgSO_4$ and may be crystallized by pressure crystallization or by conventional evaporation. The $MgSO_4$ solids may be sent to a furnace with coal or any other reducing agent to produce MgO and $SO_2$. The MgO may be used as neutralizing agent and the $SO_2$ may be sent to the acid plant.

Some advantages of the present process may include one or more of:
- Increased extraction of value metal, such as nickel and cobalt;
- Better deposit exploitation;
- Reduced acid consumption;
- Reduced consumption of neutralizing agent;
- Better settling properties of pulp;
- Reduced consumption of flocculants;
- No need for saprolite/limonite separation;
- Better usage of autoclave free acidity.

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and thereof. Therefore, aspects of the invention are intended to embrace all known or later-developed alternatives, modifications, variations, improvements, and/or substantial equivalents.

What is claimed is:

1. A direct purification process of a nickel laterite leaching effluent, comprising:
   providing a nickel laterite leaching solution;
   adjusting the pH of the nickel laterite leaching solution to be between 1.0 and 3.0;
   contacting the pH-adjusted nickel laterite leaching solution with a bis-picolylamine ion exchange resin to adsorb nickel and copper selectively over iron and cobalt; and
   recovering nickel, wherein the pH-adjusted leaching solution is fed at a temperature between 0° C. and 100° C., and at a flow rate of 5 to 50 BV/h.

2. The process according to claim 1, wherein the pH of the leaching solution is adjusted to be between 1.5 and 2.0.

3. The process according to claims 1, wherein the leaching solution is fed at a temperature between 20 and 70° C.

4. The process according to claim 1, wherein the leaching solution is fed at a flow rate of 15 to 25 BV/h.

5. The process according to claim 1, wherein the ion exchange resin is used in a counter-current continuous system.

6. The process according to claim 1, further comprising removing solids prior to adjusting of the pH.

7. The process of claim 1, wherein nickel and copper are selectively adsorbed over ferric or ferrous iron from the leaching solution as it passes through the ion exchange resin.

8. The process of claim 1, further comprising precipitating cobalt from the effluent of the resin raffinate.

9. The process of claim 8, further comprising crystallizing magnesium sulfate from the raffinate effluent from the precipitation of cobalt.

10. The process of claim 1, wherein the recovering of the nickel comprises contacting the ion exchange resin eluate with an acid retardation resin followed by nickel precipitation.

11. The process of claim 1, wherein the nickel laterite leaching solution contains copper that is recovered from the ion exchange resin.

* * * * *

UNITED STATES PATENT AND TRADEMARK OFFICE
CERTIFICATE OF CORRECTION

PATENT NO. : 8,628,739 B2  
APPLICATION NO. : 13/364107  
DATED : January 14, 2014  
INVENTOR(S) : Tiago Berni Page 1 of 1

It is certified that error appears in the above-identified patent and that said Letters Patent is hereby corrected as shown below:

Title Page

Item (73) - correct the Assignee as follows:

--VALE S.A., Rio de Janeiro (BR)--

Signed and Sealed this  
First Day of April, 2014

Michelle K. Lee  
*Deputy Director of the United States Patent and Trademark Office*